United States Patent

[11] 3,557,920

| [72] | Inventors | Ernest U. Lang;<br>Edwin E. Mallory, Niles, Mich. |
|---|---|---|
| [21] | Appl. No. | 783,288 |
| [22] | Filed | Dec. 12, 1968 |
| [45] | Patented | Jan. 26, 1971 |
| [73] | Assignee | National-Standard Company<br>Niles, Mich.<br>a corporation of Delaware |

[54] BAND CLUTCH CONSTRUCTION
7 Claims, 3 Drawing Figs.

[52] U.S. Cl..................................................... 192/41,
192/81
[51] Int. Cl....................................................... F16d 41/20
[50] Field of Search........................................... 192/41(S),
56(C), 81

[56] References Cited
UNITED STATES PATENTS

| 613,766 | 11/1898 | Hodgkinson | 192/41(S) |
|---|---|---|---|
| 3,270,845 | 9/1966 | Dodwell | 192/41(S) |

FOREIGN PATENTS

| 862,234 | 1/1953 | Germany | 192/41(S) |

*Primary Examiner*—Allan D. Herrmann
*Attorney*—Johnson, Dienner, Emrich, Verbeck & Wagner

ABSTRACT: In a band clutch of the overrunning type, the clutch bands are spaced apart to avoid burr entanglement at the side edges of adjacent clutch bands.

PATENTED JAN 26 1971
3,557,920
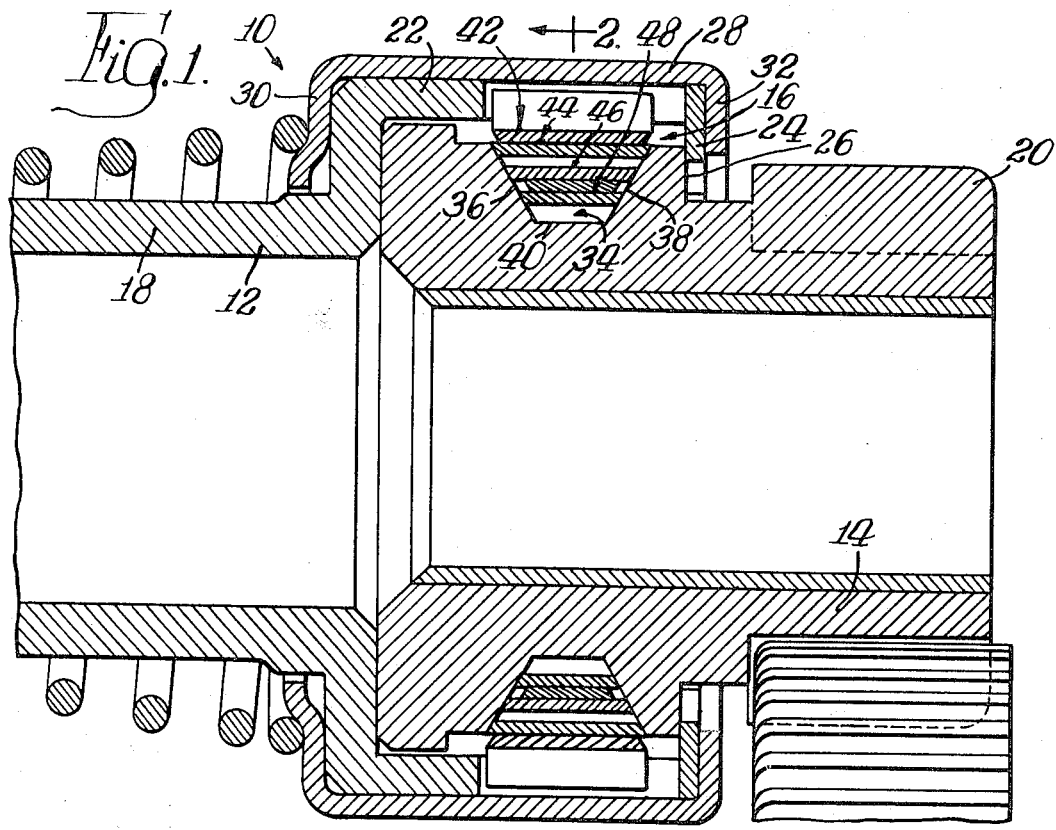
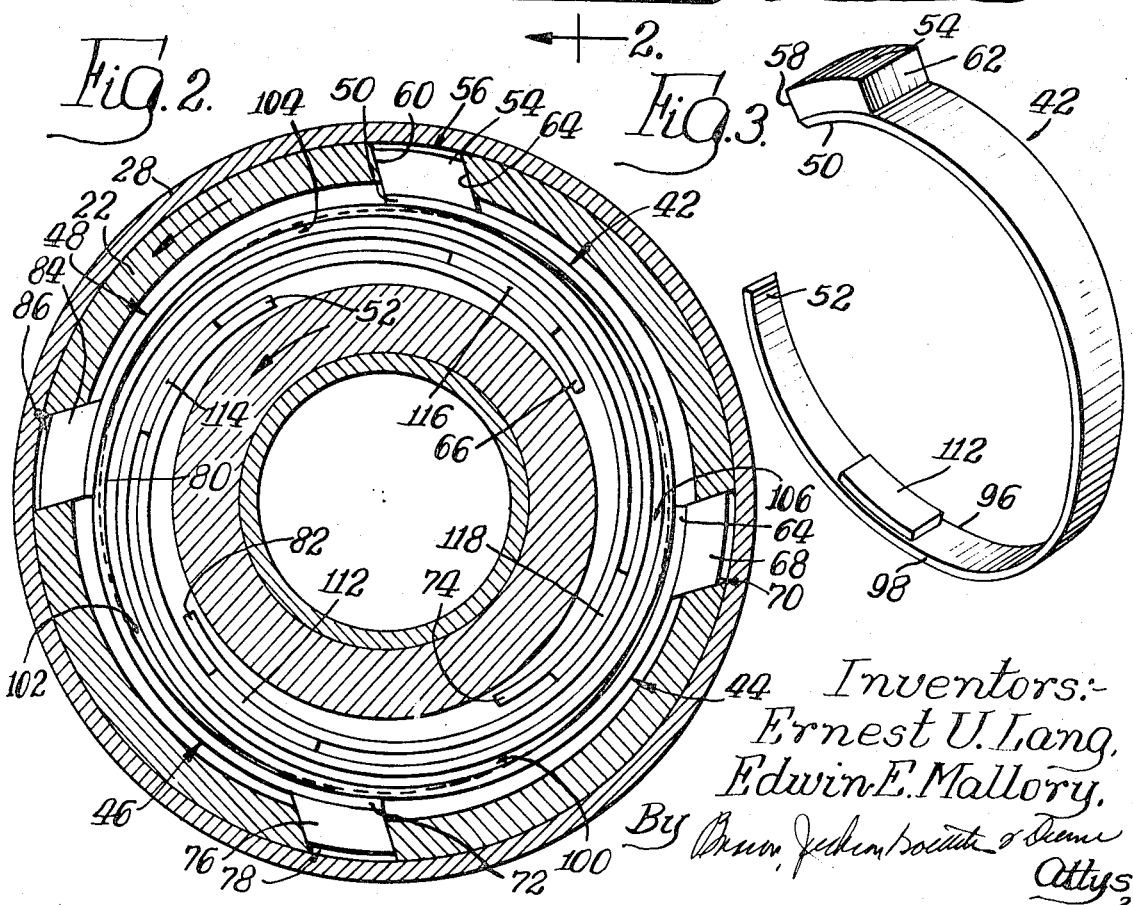
Inventors:-
Ernest U. Lang,
Edwin E. Mallory.
By Brown, Jackson, Boettcher & Dienner
Attys

BAND CLUTCH CONSTRUCTION

The present invention relates to clutch bands for band clutches of the overrunning type.

The clutch band of this invention has particular utility for the class of band clutch constructions typically shown in U.S. Pat. No. 2,518,453, issued Aug. 15, 1950, to John M. Dodwell. This patent discloses a band-type freewheeling clutch-embodying drive and driven clutch members, one of which is provided with a V-groove into which the narrow tapered ends of a plurality of interfitting and overlapping clutch bands are disposed. The wide ends of such clutch bands are fixed to the other of such clutch members. The arrangement is such that upon rotation of the drive member in one direction a driven member is driven in the same direction through engagement of the side edges of the narrow tapered ends of the clutch bands with the sidewalls of the V-groove. Furthermore, when the driven member rotates at a faster speed than the drive member, the clutch bands permit the driven member to overrun the drive member.

In certain later forms of band clutches of the above type, single clutch bands are employed.

In a typical clutch of this type, the wide ends of the clutch bands are fixed to the drive clutch member, and a V-groove is formed in the driven clutch member and into which the narrow ends of the bands extend. In operation of such a clutch, upon rotation of the drive clutch member so as to tighten the clutch bands around the V-groove, the overlying portions of the clutch bands are drawn tightly against the underlying portions of the clutch bands, and the side edges of the clutch bands are urged into frictional driving engagement with the sidewalls of the V-groove. Thus, the driven clutch member is rotated in the same direction as the driven clutch member. However, when the driven clutch member overruns the drive clutch member, the side edges of the clutch bands are disengaged from the sidewalls of the V-groove.

Heretofore, in order to insure that the side edges of the clutch bands will be urged into frictional driving engagement with the sidewalls of the V-groove upon rotation of the drive clutch member so as to tighten the clutch bands around the V-groove, it has been necessary to have each clutch band tapered identically and to a precise angle of taper, referred to as the "theoretical angle," determined by the taper of the sidewalls of the V-groove, such that the overlying portions of the clutch bands may be drawn tightly against the underlying portions of the clutch bands, as will be understood.

The clutch bands of such a clutch are made of spring steel stock, suitably shaped and heat treated, formed to the desired curvature, and heat set. In forming the blanks for the clutch bands, it is important that the side edges of each clutch band be free of burrs to permit the clutch bands to slide freely one over the other during engagement and disengagement of the side edges of the clutch bands with the sidewalls of the V-groove. Thus, a high degree of mechanical accuracy must be maintained.

In a typical clutch, as described, failure often first is marked by slipping of the clutch bands after a number of clutching cycles. In such instances, it often is found that the inner corners of the clutch bands have worn to a condition wherein the clutch bands no longer have an initial grip on the sidewalls of the V-groove. Furthermore, as the clutch bands are wearing, any slight accumulation of metal or burrs at the side edges of the clutch bands between one and the next will cause unitization of two or more of the clutch bands and will prevent the clutch bands from sliding one over the other during engagement and disengagement of the side edges of the clutch bands with the sidewalls of the V-groove. The worn bands will have to be reshaped or replaced.

Heretofore, to prevent failure of the clutch from the accumulation of metal or the formation of burrs at the side edges of the clutch bands owing either to forming of the clutch bands or to wearing of the clutch bands after numerous clutching cycles, it has been proposed to coin the side edges of the clutch bands after forming to provide relieved area between adjacent clutch bands for the accumulation of metal and the formation of burrs. One method whereby this may be done is disclosed in U.S. Pat. No. 3,270,845, issued Sept. 6, 1966, to John M. Dodwell.

The present invention is addressed to a novel solution to the problem of preventing failure of a band clutch from the accumulation of metal or the formation of burrs at the side edges of the clutch bands owing either to forming of the clutch bands or to wearing of the clutch bands after numerous clutching cycles. The present invention eliminates any need for coining the side edges of the clutch bands and permits a greater contact area per unit length to be provided between the side edges of the clutch bands and the sidewalls of the V-groove.

It is the primary object of this invention to provide a band clutch, of the type described hereinbefore, in which the clutch bands are spaced apart to eliminate engagement of overlapping clutch bands at the side edges of one clutch band with the side edges of the next adjacent clutch band.

Preferably, the above object is attained by having each clutch band tapered to an angle of taper slightly greater than the aforementioned theoretical angle for the taper of the sidewalls of the V-groove. As a result, the clutch bands spiral more deeply into the V-groove, and open interstices are formed between adjacent clutch bands. Because of the wedging action of the side edges of the clutch bands between the sidewalls of the V-groove, adjacent clutch bands cannot be drawn into engagement one with the other.

To get a compounding action, it is necessary that at least the tips of the clutch bands be forced into the V-groove. This is readily accomplished by means of an integral spacer at the radial-underside of each clutch band engaging the underlying clutch band adjacent the tip thereof. Each spacer should have a thickness at least equal to and preferably slightly greater than the radial height of the interstices between the clutch bands so as to compound the tip pressure. Such spacers serve the further important purposes of keeping the clutch bands from twisting within the V-groove and keeping the clutch bands apart after disengagement of the side edges of the clutch bands and while the clutch is in an overrunning condition.

The manufacturing accuracy called for in manufacturing band clutches embodying the principles of the present invention and thus having spaced-apart clutch bands, is far less than that called for in manufacturing band clutches having tightly overlapping bands. A first reason is that, in band clutches of the present invention, removal of metal accumulations and burrs from the side edges of the clutch bands after forming of the clutch bands is not crucial. Burr entanglement and the like is eliminated by having the clutch bands spaced apart at all times during operation of the clutch. A second reason is that the need for coining or coining and beveling the side edges of the clutch bands is eliminated. Any metal accumulations or burrs caused by wearing of the clutch bands do not cause interference at the side edges of adjacent clutch bands but are received by the interstices between the clutch bands.

Furthermore, there is a distinct advantage in using spaced-apart clutch bands having uncoined side edges instead of tightly overlapping clutch bands having coined or coined and beveled side edges. Greater contact area per unit length is available with the former than is available with the latter. As a result, the spaced-apart clutch bands having uncoined side edges have better wear characteristics, and greater torque may be transmitted through the clutch.

These and other objects, features, and advantages of the present invention will be evident from the following description with the aid of the attached drawings of a preferred embodiment of the invention.

In the drawing:

FIG. 1 is a vertical sectional view through a clutch employing clutch bands of the present invention;

FIG. 2 is a detail sectional view taken substantially on the line 2-2 of FIG. 1 looking in the direction of the arrows; and FIG. 3 is a perspective view of a clutch band of the present invention as shown in FIGS. 1 and 2.

DESCRIPTION OF THE PREFERRED EMBODIMENT

In FIGS. 1 and 2, there is shown an overrunning band clutch 10 which has known drive and driven clutch members 12 and 14, respectively, and with which clutch band means of the present invention, indicated generally at 16, has been incorporated.

In the clutch 10, the drive clutch member 12 is in the form of a drive shaft 18 adapted to be driven by a suitable prime mover (not shown) and the driven clutch member 14 may have a pinion 20 made fast thereto to effect driving of any desired driven member. The drive clutch member 12 has an annular flange 22 at the outer end thereof. The inner end of the driven clutch member 14 is arranged coaxially within the annular flange 22 in piloting relation to the drive clutch member 12. Thus, in the arrangement of the parts as shown, when the driven clutch member 14 is rotating in the same direction as the drive clutch member 12 but at a faster speed, the driven clutch member 14 overruns the drive clutch member 12. A thrust washer 24 engages the outer end of the annular flange 22 and the end wall 26 of the driven clutch member 14 and is retained in position by a housing 28 enclosing the clutch 10 between radially inwardly extending flanges 30 and 32.

As in known in clutches of this type, the driven clutch member 14 is formed with a circumferentially extending V-groove 34 defined by opposed sidewalls 36 and 38 tapering inwardly toward each other and by a bottom wall 40. Conventionally, the driven clutch member 14 is made of hardened steel or the like to withstand the wedging action of the clutch band means 16 next to be described.

The aforementioned clutch band means 16, in the present embodiment, comprises four identical clutch bands 42, 44, 46 and 48, respectively, of generally spiral configuration, in an interfitting and overlapping arrangement, each preferably being made of spring steel stock.

The clutch band 42 is shown by way of example in FIG. 3. The clutch band 42 has a wider end portion 50 and a narrower end portion or tip 52 and is tapered therebetween. The clutch band 42 has an integral projecting anchor 54 adjacent the wider end portion 50 fitted into a suitably disposed conformably formed anchor pocket 56 in the annular flange 22 of the drive clutch member 12. The anchor 54 has a clutch release face 58 at its outer end engaging the back end wall 60 of the anchor pocket 56 and a clutch drive face 62 at its inner end engaging the front end wall 64 of the anchor pocket 56. As shown, the anchor 54 is a solid piece brazed or otherwise integrally attached to the clutch band 42 at the wider end portion 50. The clutch faces 58 and 62 are parallel, permitting generally radial movement of the wider end portion 50 of the clutch band 42 during operation of the clutch 10 and thus minimizing stresses on the clutch band 42.

The clutch band 44 similarly has a wider end portion 64 and a narrower end portion or tip 66 and is tapered therebetween. The clutch band 44 also similarly has an integral projecting anchor 68 at the wider end portion 64 fitted into a suitably disposed conformably formed anchor pocket 70 in the annular flange 22 of the drive clutch member 12. The clutch band 46 similarly has a wider end portion 72 and a narrower end portion or tip 74 and is tapered therebetween. The clutch band 46 also similarly has an integral projecting anchor 76 at the wider end portion 72 fitted into a suitably disposed conformably formed anchor pocket 78 in the annular flange 22 of the drive clutch member 12. The clutch band 48 similarly has a wider end portion 80 and a narrower end portion or tip 82 and is tapered therebetween. The clutch band 48 also similarly has an integral projecting anchor 84 at the wider end portion 80 fitted into a suitably disposed conformably formed anchor pocket 86 in the annular flange 22 of the drive clutch member 12.

Because the relationships of the anchors 68, 76 and 84 respectively, to the anchor pockets 70, 78 and 86 respectively, are similar to the relationship of the anchor 54 to the anchor pocket 56, no further detailed description thereof is included herein. It should be understood that the anchors 54, 68, 76 and 84 are exemplary and that anchors of any other suitable form may be used.

In operation of the clutch 10, upon rotation of the drive clutch member 12 in the direction of the arrow applied thereto in FIG. 2, the front end walls of the anchor pockets 56, 70, 78 and 86 engage the clutch drive faces of the anchors 54, 68, 76 and 84 to tighten the clutch bands 42—48 around the V-groove 34 such that the side edges of the clutch bands 42—48 are urged into frictional driving engagement with the sidewalls 36 and 38 of the V-groove 34. Thus, the driven clutch member 14 is rotated in the same direction, as is indicated by the arrow applied thereto in FIG. 2. However, when the driven clutch member 14 overruns the drive clutch member 12, the clutch release faces of the anchors 54, 68, 76 and 84 engage the back end walls of the anchor pockets 56, 70, 78 and 86 and effect disengagement of the side edges of the clutch bands 42—48 from the sidewalls 36 and 38 of the V-groove 34.

As will be understood from the drawing, each of the clutch bands 42—48 is tapered identically and to an angle of taper slightly greater than the theoretical angle for the taper of the sidewalls of the V-groove around which the clutch bands 42—48 are to be wound, that is, to an angle of taper slightly greater than that angle whereby the clutch bands 42—48 would tightly overlap one against the other when the clutch bands 42—48 were tightened. As a result, the clutch bands 42—48 spiral more deeply into the V-groove 34, and open interstices are formed between adjacent clutch bands. One interstice 100 is formed between the clutch bands 44 and 42, another interstice 102 between the clutch bands 46 and 44, another interstice 104 between the clutch bands 48 and 46, and another interstice 106 between the clutch bands 42 and 48. Because of the wedging action of the side edges 96 and 98 of the clutch band 42 and the side edges (not numbered) of the clutch bands 44—48 between the sidewalls 36 and 38 of the V-groove 34, adjacent clutch bands cannot be drawn into engagement one with the other within the V-groove 34. The clutch bands 42—48 can engage one another beyond the V-groove 34 only at the anchored ends of the overlying clutch bands and only if permitted by the construction of the anchors.

Because of the tendency of the clutch bands 42—48 to straighten out, in order that the side edges of the spaced apart clutch bands 42—48 may be engaged with the sidewalls 36 and 38 of the V-groove, it is necessary that at least the narrow ends or tips 52, etc. of the clutch bands 42—48 be forced into the V-groove 34. Accordingly, a spacer 112 is provided between the clutch bands 42 and 48, preferably being integral with the clutch band 42 at the radial underside thereof and engaging the underlying clutch band 48 adjacent the narrow end or tip 82. A similar spacer 114 between the clutch bands 44 and 42, preferably being integral with the clutch band 44 at the radial underside thereof and engaging the underlying clutch band 42 adjacent the narrow end or tip 52, another similar spacer 116 between the clutch bands 46 and 44, preferably being integral with the clutch band 46 at the radial underside thereof and engaging the underlying clutch band 44 adjacent the narrow end or tip 66, and still another similar spacer 118 between the clutch bands 48 and 46, preferably being integral with the clutch band 48 at the radial underside thereof and engaging the underlying clutch band 46 adjacent the narrow end or tip 74 are provided in like manner. In the alternative, the spacers 112—118 may be integral with the underlying clutch bands adjacent the narrow ends or tips thereof.

To compound the tip pressure, each of the spacers 112—118 has a thickness at least equal to and preferably slightly greater than the radial height of the interstices 100—106 between the clutch bands 42—48. As the clutch bands 42—48 are being tightened around the V-groove 34, the spacers force the narrower end portions or tips of the clutch bands 42—48 into the V-groove 34. If the thickness of the spacers 112—118 is slightly greater than the radial height of the clutch band interstices 100—106, as mentioned, those adjacent portions of the clutch bands 42—48 having the spacers 112—118 integral therewith cannot be fully wedged into the V-groove 34. As a result, the narrower end portions or tips of the clutch bands 42—48 are driven more forcefully into the V-groove 34.

In operation of the clutch 10, when the driven clutch member 14 overruns the drive clutch member 12, the side edges of the clutch bands 42—48 are disengaged from the sidewalls 36 and 38 of the V-groove 34. In this connection, the spacers 112—118 serve the further important purposes of keeping the clutch bands 42—48 from twisting within the V-groove 34 and keeping the clutch bands 42—48 apart after disengagement of the side edges of the clutch bands 42—48 and while the clutch 10 is in an overrunning condition. For these purposes, additional spacers (not shown), similar to the spacers 112—118, may be provided in suitable places on the radial undersides of the respective clutch bands 42—48.

It is preferred that the spacers 112—118 be solid pieces, as shown, brazed or otherwise integrally attached to the clutch bands 42—48. It also is preferred that the spacers 112—118 be narrower than those portions of the clutch bands 42—48 to which they are attached, as shown, to avoid any contact between the spacers 112—118 and the sidewalls 36 and 38 of the V-groove. It also is preferred that each of the spacers 112—118 extend from 30° to 60° with respect to the V-groove 34, to distribute the generally radially downward driving forces on the narrower end portions or tips of the clutch bands 42—48 without unduly stiffening those portions of the clutch bands 42—48 to which the spacers 112—118 are attached.

Furthermore, it is preferred that the side edges of at least those portions of the clutch bands 42—48 which engage the sidewalls 36 and 38 of the V-groove 34 be die-formed or otherwise suitably beveled with a taper similar to the taper of the sidewalls 36 and 38 of the V-groove 34, as in FIGS. 1 and 3. Inasmuch as there is no need to coin the side edges of the clutch bands 42—48, greater contact per unit length is provided between the side edges of the clutch bands 42—48 and the sidewalls 36 and 38 of the V-groove 34. As a result, the spaced-apart clutch bands 42—48 having uncoined side edges have better wear characteristics, and greater torque may be transmitted through the clutch 10.

It will be understood that the present invention can also be applied to a band clutch of the overrunning type in which a single band is used.

While a preferred embodiment of the invention has been shown and described, it will be understood that various modifications and rearrangements may be made therein without departing from the spirit and scope of the invention.

We claim:

1. In an overrunning band clutch having a drive clutch member and a driven clutch member coaxially disposed with respect to the drive clutch member, one of the clutch members being provided with a circumferentially extending V-groove, the improvement comprising spiral clutch band means wider at one end portion thereof than at the other end portion thereof, said clutch band means being anchored at said wider end portion to the other of the clutch members with said other end portion extending into the V-groove of said one clutch member, said clutch band means being tapered at said other end portion such that overlying and underlying tapered portions of said clutch band means are spaced therebetween within the V-groove of said one clutch member during engagement and disengagement of the side edges of said clutch band means with the sidewalls of the V-groove of said one clutch member.

2. The improvement of claim 1 further comprising spacing and driving means for spacing apart overlying and underlying portions of said clutch band means, and for driving portions of said clutch band means into the V-groove of said one clutch member during engagement of the side edges of said clutch band means with the sidewalls of said one clutch member.

3. The improvement of claim 2 wherein said spacing and driving means comprises a solid piece integral with each of said clutch bands on the underside thereof and overlying said other end portion of the next adjacent clutch band.

4. The improvement of claim 3 wherein each of said solid pieces extends for at least 30° with respect to the V-groove of said one clutch member.

5. The improvement of claim 4 wherein each of said solid pieces extends for from 30° to 60° with respect to the V-groove.

6. The improvement of claim 3 wherein each of said solid pieces has a thickness at least equal to the radial height of the interstices between said clutch bands.

7. The improvement of claim 6 wherein each of said solid pieces has a thickness slightly greater than said radial height.